(12) United States Patent
Inoue (10) Patent No.: US 6,970,273 B1
(45) Date of Patent: Nov. 29, 2005

(54) METHOD OF TONE REPRODUCTION WITH HALFTONE DOTS, APPARATUS FOR OUTPUTTING HALFTONE PLATE, HALFTONE PLATE, AND PRINTED MATERIAL

(75) Inventor: Yoshiaki Inoue, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/575,529

(22) Filed: May 22, 2000

(30) Foreign Application Priority Data

May 21, 1999 (JP) .................................. 11-141921

(51) Int. Cl.⁷ ............................................ H04N 1/405
(52) U.S. Cl. ................................... 358/3.02; 358/3.06
(58) Field of Search ............................ 358/3.02, 3.09, 358/3.11, 3.12, 3.06, 1.9, 534

(56) References Cited

U.S. PATENT DOCUMENTS

| | | | |
|---|---|---|---|
| 3,688,033 A | | 8/1972 | Hell et al. |
| 4,196,451 A | * | 4/1980 | Pellar .......................... 358/534 |
| 5,166,809 A | | 11/1992 | Surbrook |
| 5,264,926 A | * | 11/1993 | Rylander .................... 358/500 |
| 5,446,558 A | * | 8/1995 | Hamilton et al. .......... 358/3.09 |
| 5,448,366 A | | 9/1995 | Hamilton, Jr. |
| 5,541,743 A | * | 7/1996 | Shiomi et al. ............... 358/534 |
| 5,583,660 A | * | 12/1996 | Rylander .................... 358/3.17 |
| 5,696,604 A | * | 12/1997 | Curry ........................ 358/3.02 |
| 5,884,013 A | * | 3/1999 | Bosschaerts et al. ......... 358/1.9 |

FOREIGN PATENT DOCUMENTS

| | | | |
|---|---|---|---|
| EP | 454274 A2 | * 10/1991 | ............ H04N 1/40 |
| EP | 0 721 279 A2 | 7/1996 | |
| EP | 1054559 A2 | * 11/2000 | .......... H04N 1/405 |
| WO | WO 95/27365 A1 | 10/1995 | |

OTHER PUBLICATIONS

"Postscript Screening: Adobe Accurate Screens" by Peter Fink, MDN Corporation, Aug. 11, 1994, pp. 68-73 (Japanese version) and pp. 63-69 (English version).

* cited by examiner

Primary Examiner—Scott A. Rogers
(74) Attorney, Agent, or Firm—Sughrue Mion, PLLC (57) ABSTRACT

Tone jumps are eliminated in all areas ranging from a highlight area through an intermediate tone area to a shadow area for thereby achieving a smoother tone reproduction. Halftone dots are grown in a circular shape from a halftone percentage of 0% to a first highlight percentage. Halftone dots are grown while changing from the circular shape to a square shape from the first highlight percentage to a second highlight percentage greater than the first highlight percentage. Halftone dots are grown in a square shape from the second highlight percentage to a second shadow percentage. Halftone dots are grown while changing from the square shape to a circular shape from the second shadow percentage to a first shadow percentage greater than the second shadow percentage. Halftone dots are grown in a circular shape from the first shadow percentage to a percentage of 100%. The dots stick well to the print sheet in the highlight area and clearly define inter-dot spaces in the shadow area, and no tone jumps occur in the vicinity of the halftone percentages of 50% and 78.5%.

15 Claims, 11 Drawing Sheets

METHOD OF TONE REPRODUCTION WITH HALFTONE DOTS, APPARATUS FOR OUTPUTTING HALFTONE PLATE, HALFTONE PLATE, AND PRINTED MATERIAL

BACKGROUND OF THE INVENTION

1. Field of the Invention

The present invention relates to a method of tone reproduction with halftone dots, an apparatus for outputting a halftone plate, a halftone plate, and a printed material, which are suitable for application to a printing press, a CTP (Computer To Plate) system, a CTC (Computer To Cylinder) system, a DDCP (Direct Digital Color Proofing) system, a film setter, etc. which are halftone dot image outputting apparatus for generating a multicolor-separated halftone dot image in the graphic arts fields, to prevent tone jumps in halftone dot images.

2. Description of the Related Art

In recent years, there have widely be used in the print platemaking field image scanning reading and recording apparatus for electrically processing the image information of a subject to produce a film plate for printing in order to make the printing operation efficient and improve the quality of images.

The image scanning reading and recording apparatus are basically constructed of an input section, a control section, and an output section. In the input section, an image signal is captured from a subject by an illuminating optical system, a color-separating optical system, and a photometric system.

The image signal which has been photoelectrically converted by the input section is then processed by the control section for tone correction, color correction, edge emphasis, and signal conversion from R (Red), G (Green), and Blue (B) signals into C (Cyan), M (Magenta), Y (Yellow), and K (Black) signals.

The image signal which has been processed by the control section is converted by the output section into an optical signal such as a laser signal or the like, which is processed to record a signal on a recording medium that is made of a photosensitive or thermal material. The image recorded on the recording medium is developed, and the recording medium is then used for printing.

If a subject to be duplicated by printing represents a continuous-tone image such as a photograph, a painting, etc., then it is necessary to screen the subject so as to reproduce the tone of the image with halftone dots. Specifically, on a film plate, the continuous-tone image of the subject is converted to a halftone dot image that is made up of a collection of halftone dots whose sizes depend on the highlight and shadow areas of the continuous-tone image.

It is known in the art that there are available halftone dots of different shapes, e.g., circular dots, quadrilateral (square or rhomboidal) dots, dots of geometrically mixed shapes, etc., as described in pages 68, 69, and 70 of "Postscript screening" 1st Edition, 1st Printing, written by Peter Fink, published by MDN Corporation, Aug. 11, 1994.

Figure 9:
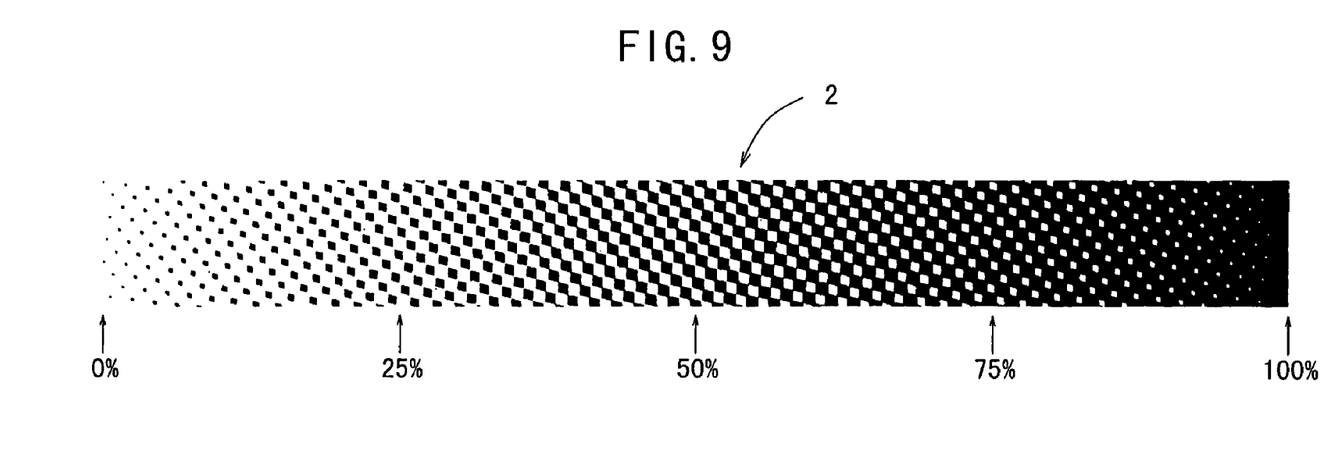
FIG. 9 is a diagram showing a conventional gradation scale of rhomboidal dots.

FIG. 9 of the accompanying drawings shows a gradation scale 2 of rhomboidal dots whose halftone percentage continuously grows from 0% to 100%.

Figure 10:
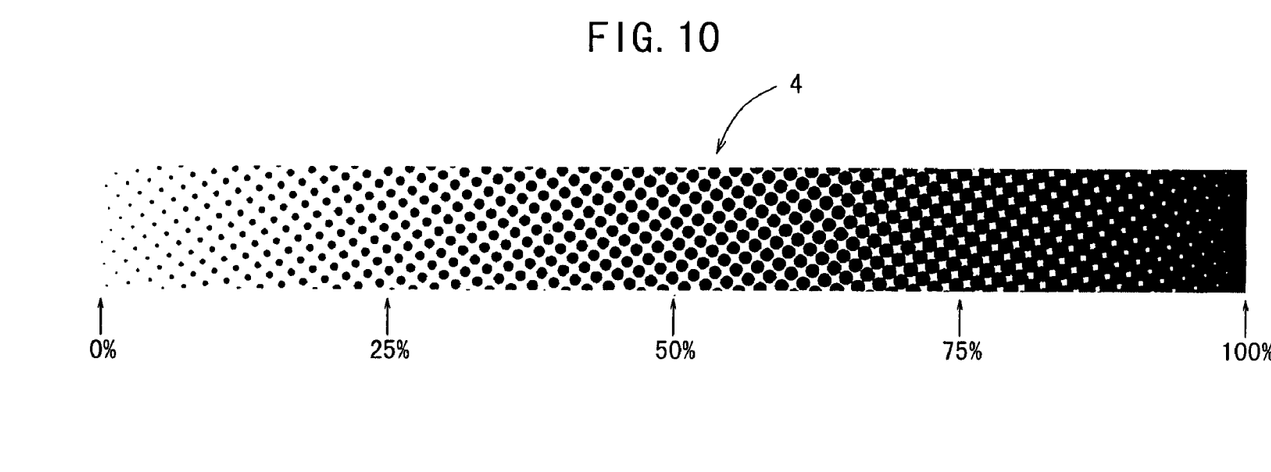
FIG. 10 is a diagram showing a conventional gradation scale of circular dots.

FIG. 10 of the accompanying drawings shows a gradation scale 4 of circular dots whose halftone percentage continuously grows from 0% to 100%.

Figure 11:
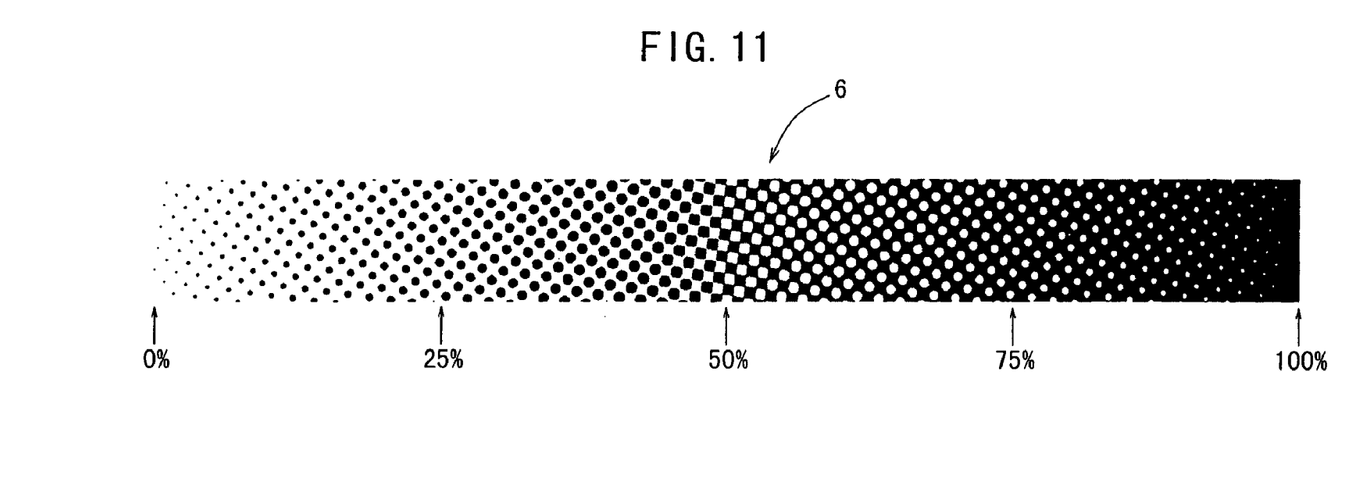
FIG. 11 is a diagram showing a conventional gradation scale of geometrically mixed shapes.

FIG. 11 of the accompanying drawings shows a gradation scale 6 of dots of geometrically mixed shapes whose halftone percentage continuously grows from 0% to 100%.

In order to form images of halftone dots, it is preferable to generate halftone plates such as film plates capable of a smoother tone reproduction free of tone jumps.

In the gradation scale 2 shown in FIG. 9, square halftone dots (including rhomboidal halftone dots) range from a highlight area which is a bright area of lower density through an intermediate tone area to a shadow area which is a dark area of high density. It is known in the art that the tone reproduction of the shapes of the respective dots in the gradation scale 2 cannot be accurately performed in both the highlight area and the shadow area.

In the gradation scale 4 shown in FIG. 10, circular halftone dots range from a highlight area of lower density through an intermediate tone area to a shadow area of high density. It is known in the art that the tone reproduction of the shapes of the respective dots in the gradation scale 4 can be accurately performed in the highlight area, but it cannot be accurately performed in the shadow area, and a tone jump occurs at halftone dot junctions in the vicinity of the halftone percentage of 78.5%.

In the gradation scale 6 shown in FIG. 11, a highlight area is composed of circular halftone dots, an intermediate tone area at the halftone percentage of 50% is composed of square halftone dots, and a shadow area is composed of dots that are in symmetrically shaped relation to the dots in the highlight area across the halftone percentage of 50%. In the gradation scale 6, the tone reproduction of the shapes of the respective dots can be accurately performed in both the highlight area and the shadow area, and the gradation changes smoothly up to the halftone percentage of 50%. However, the gradation scale 6 made up of dots of geometrically mixed shapes is disadvantageous in that a large tone jump occurs in the vicinity of the halftone percentage of 50%.

SUMMARY OF THE INVENTION

It is therefore an object of the present invention to provide a method of tone reproduction with halftone dots, an apparatus for outputting a halftone plate, a halftone plate, and a printed material, which are capable of eliminating tone jumps in all areas ranging from a highlight area through an intermediate tone area to a shadow area for thereby achieving a smoother tone reproduction.

In a method of tone reproduction of an image with halftone dots, the halftone dots are grown in a circular or elliptical shape in a first transformation zone from a halftone percentage of 0% to a first highlight percentage, grown while changing from the circular or elliptical shape to a square or rhomboidal shape in a second transformation zone from the first highlight percentage to a second highlight percentage greater than the first highlight percentage, grown in a square or rhomboidal shape in a third transformation zone from the second highlight percentage to a second shadow percentage, grown while changing from the square or rhomboidal shape to a circular or elliptical shape in a fourth transformation zone from the second shadow percentage to a first shadow percentage greater than the second shadow percentage, and grown in a circular or elliptical shape in a fifth transformation zone from the first shadow percentage to a percentage of 100%.

With the above arrangement, the tone reproduction of the shapes of the dots can be accurately performed in the highlight area and the shadow area, and no tone jumps occur in the vicinity of the halftone percentages of 50% and 78.5%.

The second highlight percentage may be at most 48% and the second shadow percentage may be at least 52%.

When the halftone dots are grown in the square or rhomboidal shape, they are preferably successively grown along each of the sides thereof while minimizing any displacement of the center of gravity of the halftone dots, for preventing tone jumps from occurring.

The present invention is also applicable to an apparatus for outputting a halftone plate.

The present invention is also applicable to a halftone plate expressing highlight and shadow areas of a subject with sizes of halftone dots.

The present invention is also applicable to a printed material expressing highlight and shadow areas of a subject with sizes of halftone dots.

The above and other objects, features, and advantages of the present invention will become apparent from the following description when taken in conjunction with the accompanying drawings in which preferred embodiments of the present invention are shown by way of illustrative example.

DESCRIPTION OF THE PREFERRED EMBODIMENTS

Figure 1:
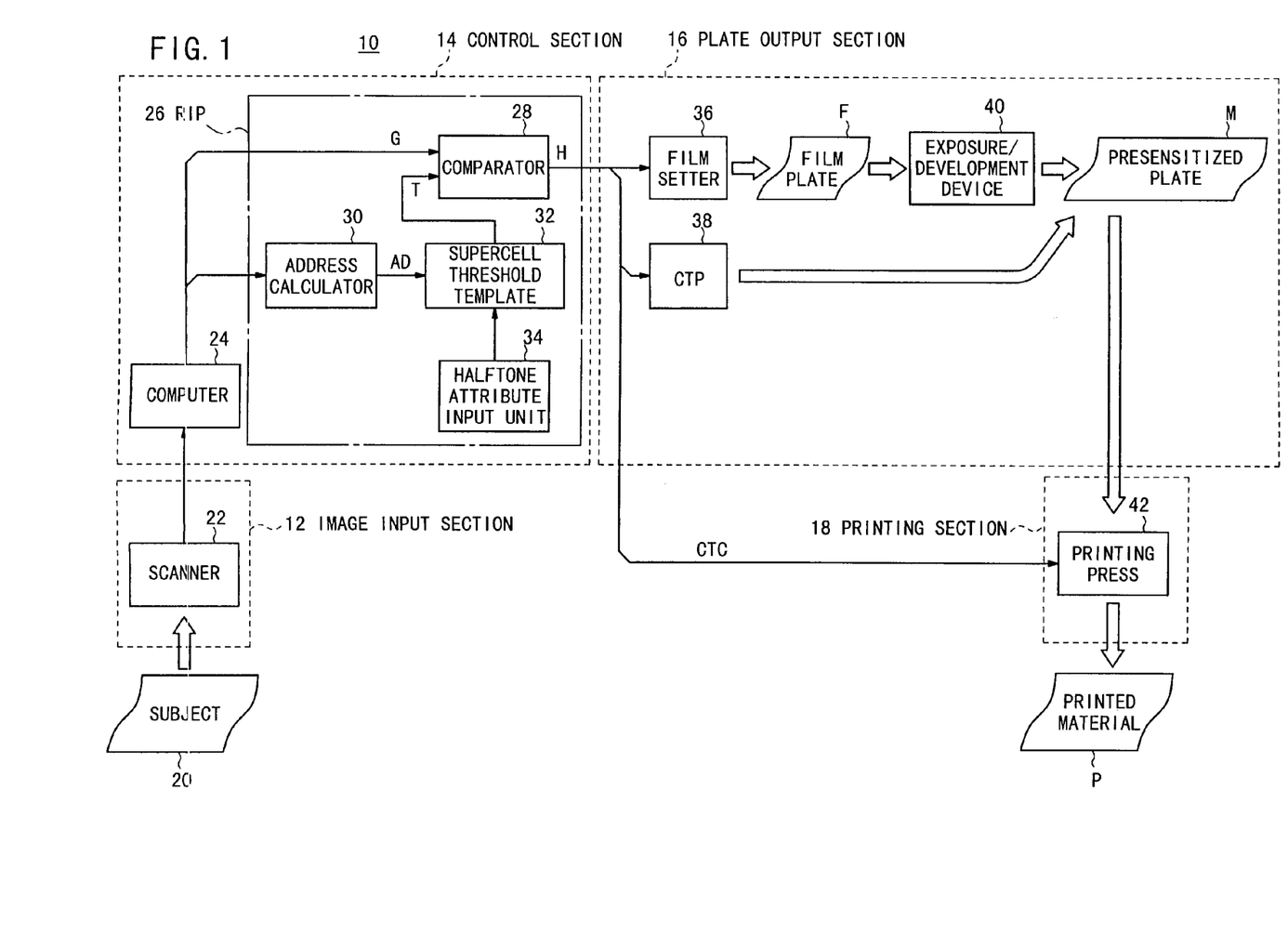
FIG. 1 is a block diagram of a basic arrangement of a print platemaking system based on the principles according to the present invention.

FIG. 1 shows in block form a print platemaking system based on the principles according to the present invention.

As shown in FIG. 1, the print platemaking system 10 basically comprises an image input section 12, a control section 14, a plate output section 16, and a printing section 18. The print platemaking system 10 is a system for outputting a film plate F and a presensitized plate M, each as a halftone plate having a halftone dot image representing a continuous-tone image read from a subject 20, and a printed material P. Each of the film plate F, the presensitized plate M, and the printed material P functions as an image reproduction medium because it is a medium representing the halftone dot image representing the continuous-tone image read from the subject 20.

The image input section 12 comprises a scanner 22 in the illustrated embodiment. In the scanner 22, the subject 20 which is irradiated with light from a light source while being fed in an auxiliary scanning direction reflects or passes the light, which is guided to a photoelectric transducer such as a CCD linear image sensor or the like. The photoelectric transducer electrically scans the subject 20 in a main scanning direction perpendicular to the auxiliary scanning direction, thereby scanning the subject 20 two-dimensionally. As the subject 20 is scanned two-dimensionally, the light reflected by or passing through the subject 20 is converted into an electric analog image signal (pixel signal) by the photoelectric transducer.

The analog image signal, which represents the two-dimensional image of the subject 20, is converted by an A/D converter into digital image data (digital image signals) for R (Red), G (Green), and B (Blue), which are outputted from the image input section 12, i.e., the scanner 22.

The image input section 12 is not limited to the scanner 22, but may comprise any medium for outputting digital image data, e.g., an image recording disk (image recording medium), such as a DVD (Digital Video Disk) or the like, a communication network, a digital still camera, or the like.

The control section 14 comprises a computer 24 as an image processor and a RIP (Raster Image Processor) 26 for converting digital image data G outputted from the computer 24 into binary image data (binary scanning image data) H or multivalued image data (multivalued scanning image data), such as quarternary image data, for producing halftone dots.

The RIP 26 outputs binary image data H for turning on and off a laser beam to selectively blacken or unblacken the film plate F or the presensitized plate M, as described later on. A multivalued halftone dot image, such as a quarternary halftone dot image, may be formed on the film plate F or the like by varying a laser drive current, for example.

The computer 24 of the control section 14 processes R, G, B digital image data supplied from the scanner 22 for color correction and sharpness, converts the R, G, B digital image data into C, M, Y, K digital image data (simply referred to as "digital image data") and also converts their resolution, and outputs the processed and converted digital image data G.

In the illustrated embodiment, the digital image data G represent four color components of C, M, Y, K (plural color components). However, if the subject 20 comprises a monochromatic subject, then the digital image data G may represent a single color component of K.

Each of the digital image data G of C, M, Y, K has 256 gradations of respective values 0, 1, 2, ..., 255, where the value 0 is in a highlight area and the value 255 in a shadow area. The value 0 may be converted into a halftone percentage of 0%, the value 255 a halftone percentage of 100%, and the value 128 a halftone percentage of 50%. The halftone percentages ranging from 0 to less than 50% are in the highlight area, the halftone percentages ranging from over 50% to 100% are in the shadow area, and the halftone percentage of 50% is in the intermediate area.

The digital image data G processed by the computer 24 is supplied to a comparison input terminal of a comparator 28 of the RIP 26, and also to an address calculator 30.

The RIP 26 comprises, in addition of the comparator 28 and the address calculator 30, a supercell threshold template (also referred to as "threshold matrix" or "halftone dot threshold data") 32 as a storage unit, and a halftone attribute input unit 34.

The address calculator 30 calculates an address AD=AD (x, y) representing X- and Y-axis addresses on the supercell threshold template 32 from each address of the digital image data (pixel data) G supplied from the computer 24, and supplies the calculated address to the supercell threshold template 32.

A threshold value (either one of threshold data of the 256 gradations of respective values 0, 1, 2, . . . , 255) T stored in the designated address AD of the supercell threshold template 32 is read and supplied to a reference input terminal of the comparator 28.

The supercell threshold template 32 that is used corresponds to halftone attributes (screen ruling, screen angle, and screen shape) designated by the halftone attribute input unit 34.

A supercell comprises a plurality of dots (also referred to as "dot cells"). In the field of halftone dot generating technology, generally, a supercell is established on a pixel grid (which refers to a cluster of pixels, each as a unit to be blackened, that are arranged in a regular array of pixels in horizontal rows and vertical columns depending on the output resolution) determined by the output resolution), the established supercell is broken up into halftone dot cells, and a threshold value is assigned to each of the pixels in the divided halftone dot cells, so that halftone dot thresholds are generated. A supercell composed of plural halftone dot cells to which threshold values are assigned is referred to as the supercell threshold template 32. Each of the halftone dot cells to which threshold values are assigned is referred to as a threshold template or a threshold matrix.

As described later on, the present invention resides in the assignment of a threshold value to a threshold template, or stated otherwise, the manner in which halftone dots are grown.

The book "Postscript screening" described above may be used as a reference work for the technology for generating halftone dots in relation to a supercell.

The concept of a supercell composed of plural halftone dot cells makes it possible to vary the screen ruling and the screen angle by smaller degrees, allowing the selection of values closer to the screen ruling and the screen angle that are designated.

The comparator 28 compares the digital image data G and a threshold value T with each other to determine $G \geq T \rightarrow 1$ (laser beam on for blackening a dot) or $G < T \rightarrow 0$ (laser beam off for unblackening or blanking a dot), and outputs binary halftone dot image data (also referred to as "binary data", "binary image data", "halftone dot image data", "halftone dot gradation data" or "digital halftone dot data") H having a value 1 or a value 0 depending on the result of the comparison.

The halftone dot image data H generated by the RIP 26 is supplied to a film setter 36 or a CTP system 38 of the plate output section (also referred to as "halftone plate output section") 16. The halftone dot image data H is also supplied to a printing press 42 which also functions as a CTC system.

The plate output section 16 is constructed of the film setter 36, the CTP system 38, or an exposure/development device 40.

The film setter 36 as a halftone plate output device scans and exposes an unexposed film to a laser beam that is selectively turned on and off, i.e., modulated, based on the halftone dot image data H, thereafter develops a halftone dot image on the film, and outputs the film as a film plate F as a halftone plate with the halftone dot image formed thereon.

Then, the exposure/development device 40 as a halftone plate output device includes an exposure unit in which a PS blank plate is superposed on the film plate F closely thereto and exposed to analog light emitted from a light source and passing through the film plate F, and a development unit in which a halftone dot image on the PS blank plate is developed to generate a presensitized plate M as a halftone plate with the developed halftone dot image formed thereon.

The CTP system 38 generates a presensitized plate M directly from the halftone dot image data H outputted from the RIP 26.

The presensitized plate M is mounted as a printing plate on the printing press 42 of the printing section 18 as an apparatus for producing a printed material.

If the printing press 42 comprises a digital printing press that functions as a CTC system for exposing a printing plate blank wound around an internal cylinder directly to a laser beam to produce a printing plate as a halftone plate, then the printing press 42 produces a printing plate as a halftone plate directly from the halftone dot image data H, as shown by a route indicated by CTC in FIG. 1.

In the printing press 42, an ink is applied to the mounted printing plate, and then transferred from the printing plate to a sheet such as a print sheet, thus producing a desired printed material P with an image formed thereon.

Actually, printing plates for the colors C, M, Y, K are produced, and mounted on respective cylinders. Inks of those colors are applied to the mounted printing plates, and then transferred from the printing plates to a sheet such as a print sheet, thus producing a desired printed material P with a color image formed thereon.

The shape of a halftone dot formed on the film plate F, the presensitized plate M, or the printed material P based on each of the threshold templates (each threshold matrix) of the supercell threshold template 32 will be described below.

Figure 2:
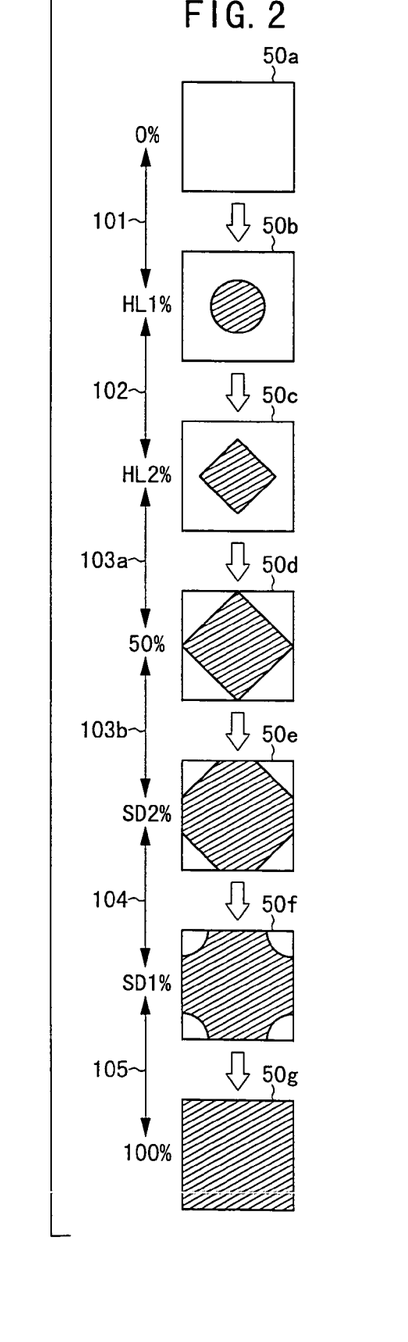
FIG. 2 is a diagram showing, by way of example, the manner in which the shape of a halftone dot grows according to the embodiment of the present invention.

FIG. 2 shows, by way of example, the manner in which the shape of a halftone dot grows on the film plate F, the presensitized plate M, or the printed material P, based on the halftone dot image data H as converted into halftone percentages, according to the embodiment of the present invention.

In FIG. 2, when the halftone percentage is 0%, a halftone dot 50a is not blackened at all.

In a first transformation zone 101 from a halftone percentage of 0% to a first highlight percentage HL1, the halftone dot 50a changes to a halftone dot 50b where the dot grows in a circular (or elliptical) shape (first halftone dot generating means).

In a second transformation zone 102 from the first highlight percentage HL1 to a second highlight percentage HL2, the halftone dot 50b grows to a halftone dot 50c where the dot changes from the circular or elliptical shape to a quadrilateral (square or rhomboidal) shape (second halftone dot generating means).

Then, in a third transformation zone 103a, 103b from =the second highlight percentage HL2 via an intermediate halftone percentage of 50% to a second shadow percentage SD2, the halftone dot 50c changes to halftone dots 50d, 50e where the dot grows in a quadrilateral shape (third halftone dot generating means).

In a fourth transformation zone 104 from the second shadow percentage SD2 to a first shadow percentage SD1 whose halftone percentage is greater than the second shadow percentage SD2, the halftone dot 50e changes to a halftone dot 50*f* where the dot changes from the quadrilateral shape to a circular (or elliptical) shape (fourth halftone dot generating means).

Finally, in a fifth transformation zone 105 from the first shadow percentage SD1 to the halftone percentage of 100%, the halftone dot 50*f* changes to a halftone dot 50*g* where the dot grows in a circular (or elliptical) shape (fifth halftone dot generating means).

Threshold values of each of the threshold templates of the supercell threshold template 32 may be arranged so as to achieve the halftone dot growth shapes shown in FIG. 2. The array of threshold values which determines a halftone dot shape may be described by the spot function of the postscript language. The supercell threshold template 32 and the spot function provide the first through fifth halftone dot generating means.

Figure 3:
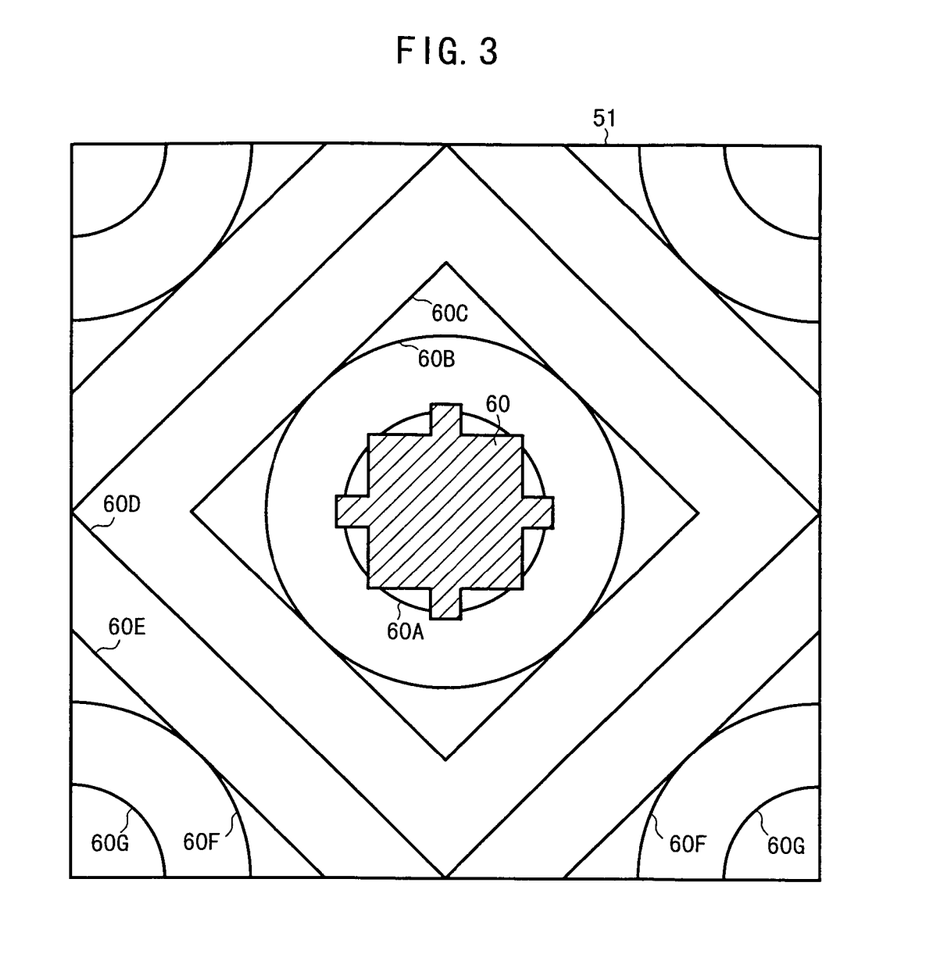
FIG. 3 is an enlarged diagram showing a combination of growth phases of the halftone dot shape shown in FIG. 2.

FIG. 3 shows a combination of growth phases of the halftone dot shape shown in FIG. 2.

In FIG. 3, a halftone dot 60 shown hatched represents an actual blackened shape of a circular dot (composed of 29 dots=25 dots+4 dots), and is schematically indicated as a circular halftone dot 60A. In this embodiment, a halftone dot 51 is grown in a successively blackened sequence from the circular halftone dot 60A in the highlight area to a circular halftone dot 60B in the highlight area to a quadrilateral halftone dot 60C in the highlight area to a quadrilateral halftone dot 60D (whose halftone percentage is 50%) to a quadrilateral halftone dot 60E in the shadow area to a circular halftone dot 60F in the shadow area to a circular halftone dot 60G in the shadow area.

Figure 4:
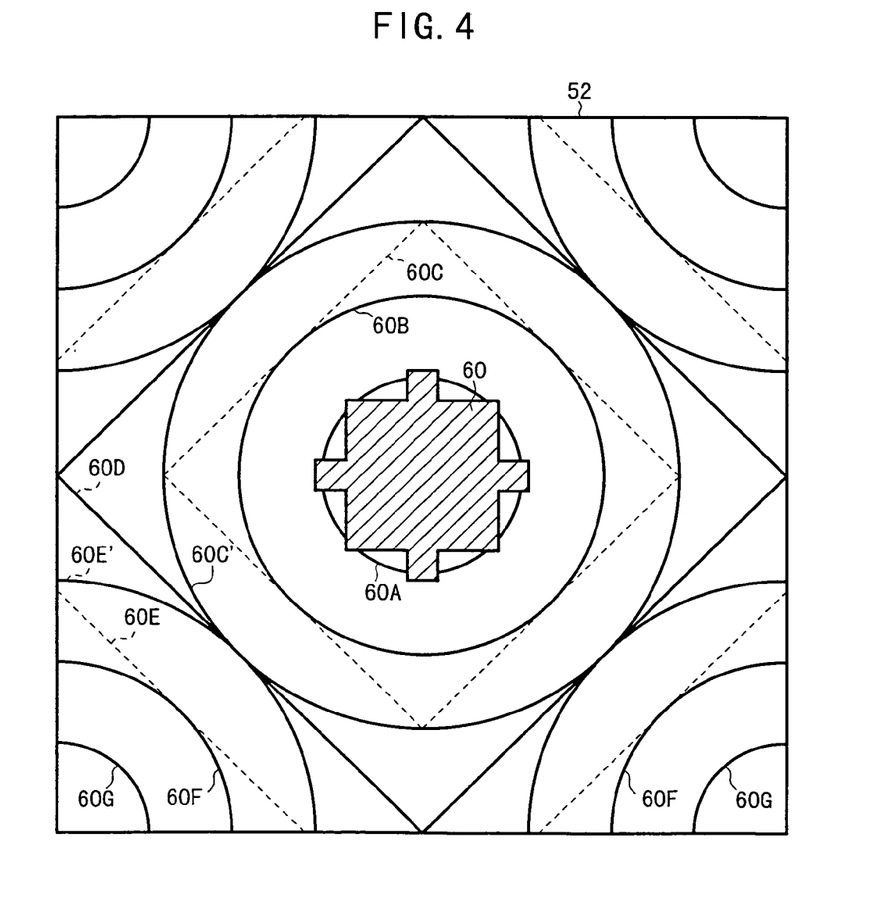
FIG. 4 is a diagram showing the manner in which a halftone dot of geometrically mixed shapes grows according to the prior art.

FIG. 4 shows a halftone dot 52 of geometrically mixed shapes grows according to the prior art for comparison purposes. In FIG. 4, the halftone dot 52 is grown in a successively blackened sequence from the circular halftone dot 60A (more accurately, the halftone dot 60) in the highlight area to the circular halftone dot 60B in the highlight area to a circular halftone dot 60C' in the highlight area to the quadrilateral halftone dot 60D (whose halftone percentage is 50%) to a circular halftone dot 60E' in the shadow area to the circular halftone dot 60F in the shadow area to the circular halftone dot 60G in the shadow area. The halftone dots 60C, 60E shown by the dotted lines are the same as the halftone dots 60C, 60E according to the present invention shown in FIG. 3.

Figure 5:
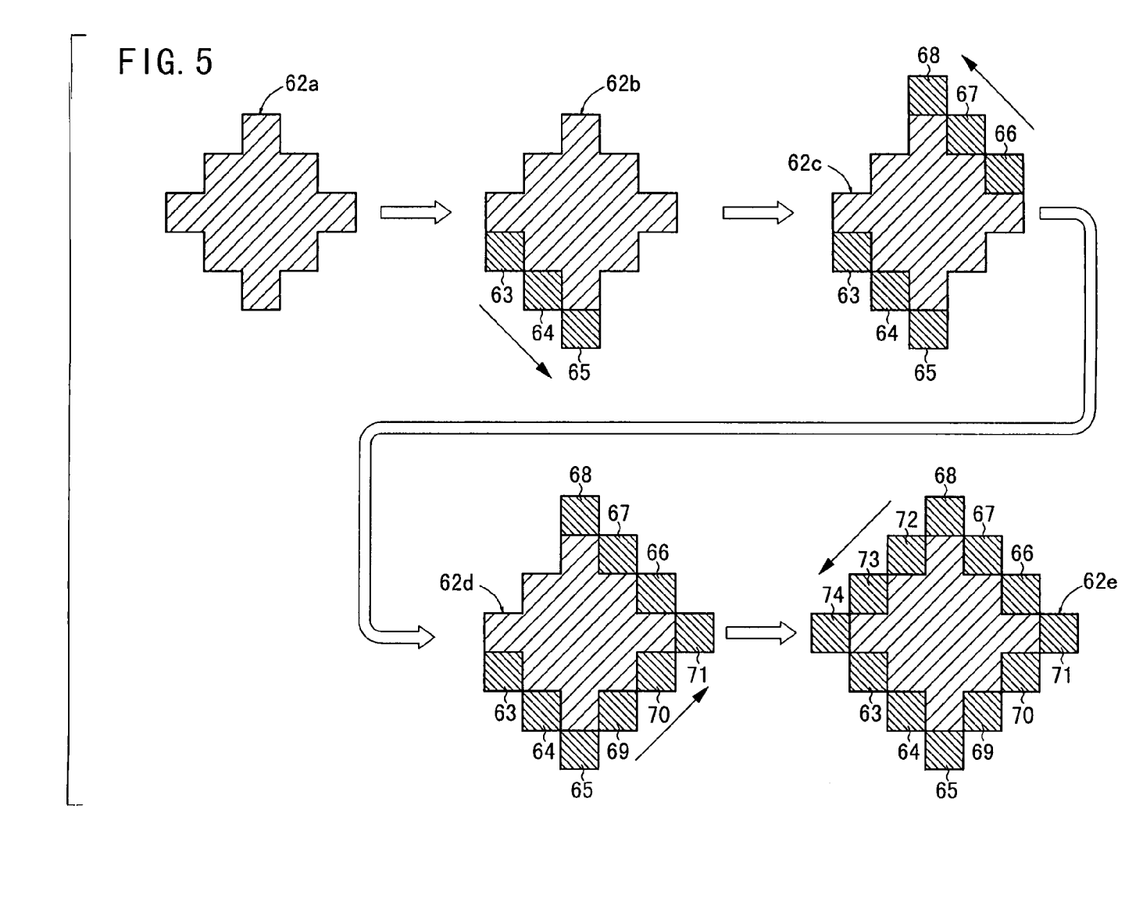
FIG. 5 is a diagram showing the manner in which a halftone dot grows in increments of quadrilateral dots in one example.

FIG. 5 shows the manner in which, in the halftone dot 51 shown in FIG. 3, the quadrilateral halftone dot 60C in the highlight area is grown into the quadrilateral halftone dot 60D (whose halftone percentage is 50%) and then into the quadrilateral halftone dot 60E in the shadow area, i.e., the halftone dot is grown from the second highlight percentage HL2 (see the quadrilateral halftone dot 50*c* in FIG. 2) via the intermediate halftone percentage of 50% into the second shadow percentage SD2 (see the quadrilateral halftone dot 50*e* in FIG. 2) in the third transformation zone 103*a*, 103*b*. In FIG. 5, the number of dots is fewer than the number of dots in FIG. 3 for an easier understanding of the present invention.

In FIG. 5, a substantially quadrilateral halftone dot 62*a* of point symmetry which is composed of 13 blackening dots is grown first into a halftone dot 62*b* by successively adding blackening dots 63, 64, 65 in the order indicated by the arrow along a side (lower left side in FIG. 5) of the halftone dot (threshold values of the supercell threshold template 32 for generating the blackening dots 63, 64, 65 are progressively greater in the sequence of the blackening dots 63, 64, 65), and then into a halftone dot 62*c* by successively adding blackening dots 66, 67, 68 in the order indicated by the arrow along an opposite side (upper right side in FIG. 5) of the halftone dot. Then, the halftone dot 62*c* is grown into a halftone dot 62*d* by successively adding blackening dots 69, 70, 71 in the order indicated by the arrow along a remaining side (lower right side in FIG. 5) of the halftone dot, and then into a halftone dot 62*e* by successively adding blackening dots 72, 73, 74 in the order indicated by the arrow along a remaining opposite side (upper left side in FIG. 5) of the halftone dot. The halftone dot 62*c* and the quadrilateral halftone dot 62*e* are of a shape of point symmetry. When the halftone dot is grown in the manner shown in FIG. 5, any displacement of the center of gravity of the halftone dot is minimum. Since the halftone dot is grown along each side thereof, the tone reproduction of the shape of the dot can be accurately performed in the printing process.

Figure 6:
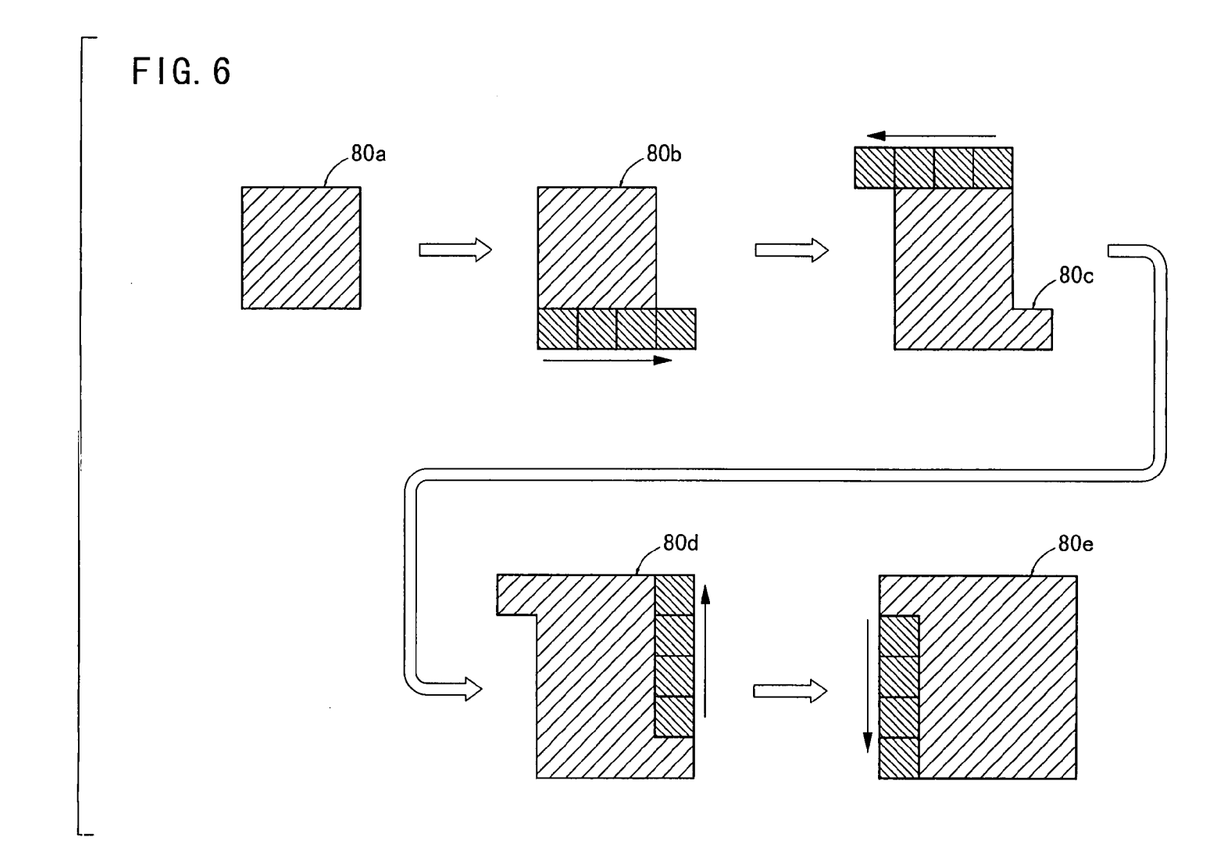
FIG. 6 is a diagram showing the manner in which a halftone dot grows in increments of quadrilateral dots in another example.

FIG. 6 shows the manner in which a halftone dot is grown in a quadrilateral (square or rhomboidal) shape successively along sides thereof with a minimum displacement of the center of gravity thereof, in another example.

In FIG. 6, a quadrilateral (square) halftone dot 80*a* which is composed of 9 blackening dots is grown first into a halftone dot 80*b* by successively adding blackening dots from the left to the right in the order indicated by the arrow along a lower side of the halftone dot, then into a halftone dot 80*c* by successively adding blackening dots from the right to the left in the order indicated by the arrow along an upper side of the halftone dot, thereafter into a halftone dot 80*d* by successively adding blackening dots upwardly in the order indicated by the arrow along a right side of the halftone dot, and finally into a halftone dot 80*e* by successively adding blackening dots downwardly in the order indicated by the arrow along a left side of the halftone dot. The halftone dot 80*e* is of a square shape. The halftone dot can further be grown in the same manner as described above. When the halftone dot is grown in the manner shown in FIG. 6, since the halftone dot is also grown along each side thereof, the tone reproduction of the shape of the dot can be accurately performed in the printing process.

Figure 7:
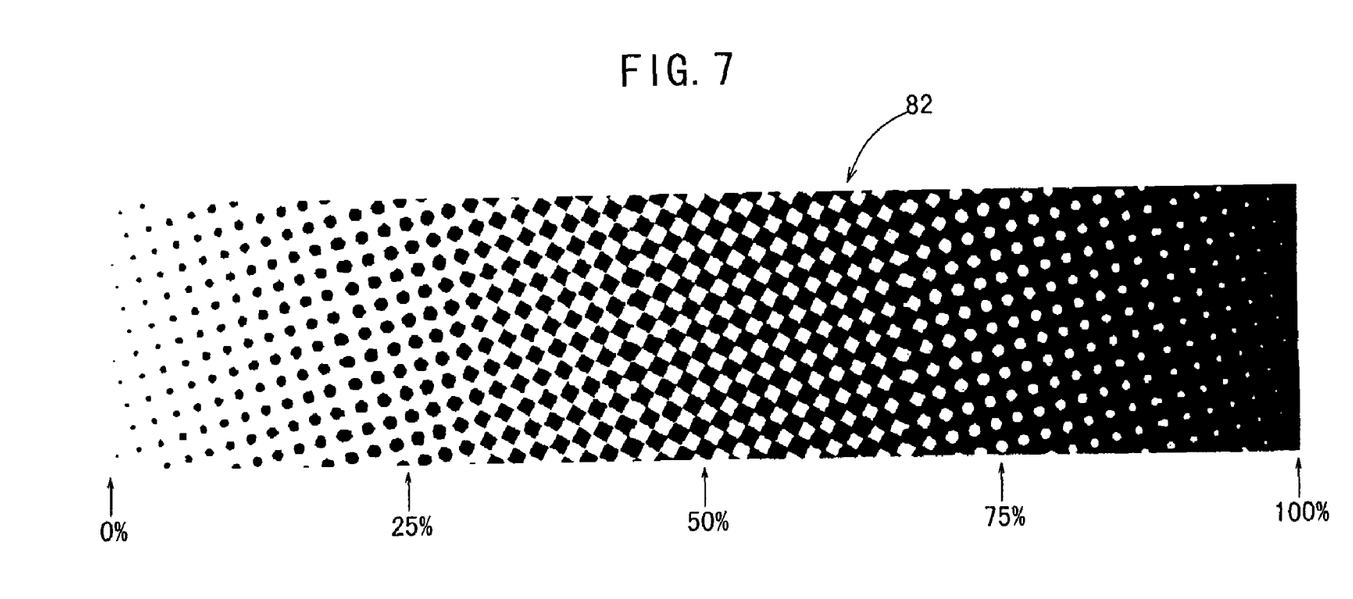
FIG. 7 is a diagram showing a gradation scale according to an embodiment of the present invention.
Figure 8:
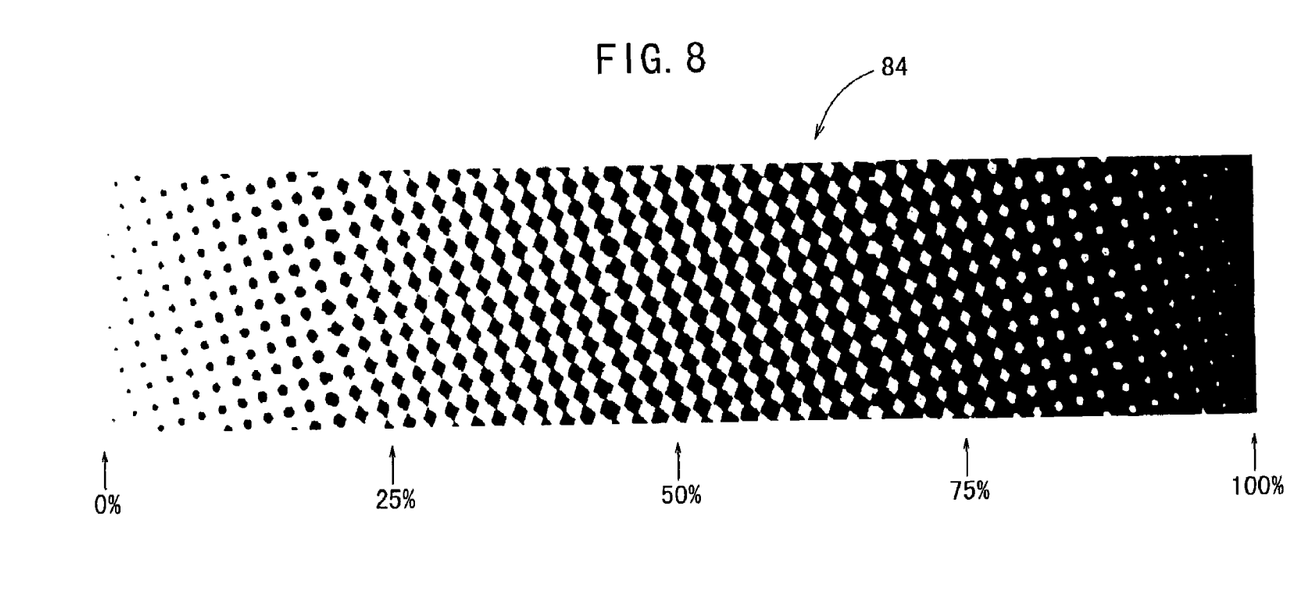
FIG. 8 is a diagram showing a gradation scale according to another embodiment of the present invention.

FIGS. 7 and 8 show gradation scales 82, 84 according to different embodiments of the present invention. The gradation scale 82 is produced based on the halftone dot growth shown in FIG. 2, and the gradation scale 84 is produced based on the halftone dot growth shown in FIG. 2 except that those halftone dots grown in a circular shape in the gradation scale 82 are grown in an elliptical shape. Specifically, the halftone dots of the gradation scales 82, 84 are grown in the following sequence (1)–(5):

(1) In the first transformation zone 101 from the halftone percentage of 0% to the first highlight percentage HL1 (HL1=25% in this example), the halftone dot is grown in a circular shape as shown in FIG. 7 or an elliptical shape as shown in FIG. 8 (first halftone plate section, first print section).

(2) In the second transformation zone 102 from the first highlight percentage HL1 to the second highlight percentage HL2 (HL2=32% in this example), the halftone dot is grown from the circular or elliptical shape into a square shape as shown in FIG. 7 or a rhomboidal shape as shown in FIG. 8 (second halftone plate section, second print section).

(3) In the third transformation zone 103*a*, 103*b* from the second highlight percentage HL2 to the second shadow percentage SD2 (SD2=68% in this example), the halftone dot is grown in a square shape as shown in FIG. 7 or a rhomboidal shape as shown in FIG. 8 (third halftone plate section, third print section).

(4) In the fourth transformation zone 104 from the second shadow percentage SD2 to the first shadow percentage SD1

(SD1=75% in this example), the halftone dot is grown from the square or rhomboidal shape into a circular shape as shown in FIG. 7 or into an elliptical shape as shown in FIG. 8 (fourth halftone plate section, fourth print section).

(5) In the fifth transformation zone 105 from the first shadow percentage SD1 to the halftone percentage of 100%, the halftone dot is grown in a circular shape as shown in FIG. 7 or an elliptical shape as shown in FIG. 8 (fifth halftone plate section, fifth print section).

When the halftone dot is grown according the embodiments described above, the tone reproduction of the shapes of the respective dots can be accurately performed in the highlight area and clearly define inter-dot spaces in the shadow area, and no tone jumps occur in the vicinity of the halftone percentages of 50% and 78.5% when the film plate F, the presensitized plate M, and the printed material P are produced.

According to the present invention, as described above, tone jumps are eliminated from all areas ranging from the highlight area through the intermediate tone area to the shadow area, making it possible to achieve a smoother tone reproduction.

Although certain preferred embodiments of the present invention have been shown and described in detail, it should be understood that various changes and modifications may be made therein without departing from the scope of the appended claims.

What is claimed is:

1. A method of tone reproduction of an image with halftone dots by forming dots arranged at regular intervals and having different sizes on an image reproduction medium based on a binary or multivalued image out of digital image data representing a single color component or a plurality of color components, comprising the steps of:
    growing the halftone dots in a circular or elliptical shape in a first transformation zone from a halftone percentage of 0% to a first highlight percentage;
    growing the halftone dots while changing from the circular or elliptical shape to a square or rhomboidal shape in a second transformation zone from the first highlight percentage to a second highlight percentage greater than said first highlight percentage;
    growing the halftone dots in a square or rhomboidal shape in a third transformation zone from the second highlight percentage to a second shadow percentage;
    growing the halftone dots while changing from the square or rhomboidal shape to a circular or elliptical shape in a fourth transformation zone from the second shadow percentage to a first shadow percentage greater than said second shadow percentage; and
    growing the halftone dots in a circular or elliptical shape in a fifth transformation zone from said first shadow percentage to a percentage of 100%.

2. A method according to claim 1, wherein said second highlight percentage is at most 48% and said second shadow percentage is at least 52%.

3. A method according to claim 1, wherein when the halftone dots are grown in the square or rhomboidal shape, they are successively grown along each of the sides thereof while minimizing any displacement of the center of gravity of the halftone dots.

4. A method of tone reproduction of an image with halftone dots according to claim 1, wherein said dots are arranged at regular intervals and have different sizes on an image reproduction medium based on a binary or multivalued image out of digital image data representing a single color component or a plurality of color components.

5. A method according to claim 1, wherein throughout the third transformation zone, angular portions of the square or rhomboidal shape maintain a substantially consistent angle.

6. A method according to claim 1, wherein the second shadow percentage is greater than the second highlight percentage.

7. An apparatus for outputting a halftone plate of halftone dots, comprising:
    first halftone dot generating means for growing the halftone dots in a circular or elliptical shape in a first transformation zone from a halftone percentage of 0% to a first highlight percentage;
    second halftone dot generating means for growing the halftone dots while changing from the circular or elliptical shape to a square or rhomboidal shape in a second transformation zone from the first highlight percentage to a second highlight percentage greater than said first highlight percentage;
    third halftone dot generating means for growing the halftone dots in a square or rhomboidal shape in a third transformation zone from the second highlight percentage to a second shadow percentage;
    fourth halftone dot generating means for growing the halftone dots while changing from the square or rhomboidal shape to a circular or elliptical shape in a fourth transformation zone from the second shadow percentage to a first shadow percentage greater than said second shadow percentage; and
    fifth halftone dot generating means for growing the halftone dots in a circular or elliptical shape in a fifth transformation zone from said first shadow percentage to a percentage of 100%.

8. An apparatus according to claim 7, wherein said second highlight percentage is at most 48% and said second shadow percentage is at least 52%.

9. An apparatus according to claim 7, wherein when the halftone dots are grown in the square or rhomboidal shape, they are successively grown along each of the sides thereof while minimizing any displacement of the center of gravity of the halftone dots.

10. A halftone plate expressing highlight and shadow areas of a subject with sizes of halftone dots, comprising:
    a first halftone plate section with the halftone dots formed in a circular or elliptical shape in a first transformation zone from a halftone percentage of 0% to a first highlight percentage;
    a second halftone plate section with the halftone dots grown while changing from the circular or elliptical shape to a square or rhomboidal shape in a second transformation zone from the first highlight percentage to a second highlight percentage greater than said first highlight percentage;
    a third halftone plate section with the halftone dots formed in a square or rhomboidal shape in a third transformation zone from the second highlight percentage to a second shadow percentage;
    a fourth halftone plate section with the halftone dots grown while changing from the square or rhomboidal shape to a circular or elliptical shape in a fourth transformation zone from the second shadow percentage to a first shadow percentage greater than said second shadow percentage; and
    a fifth halftone plate section with the halftone dots formed in a circular or elliptical shape in a fifth transformation zone from said first shadow percentage to a percentage of 100%.

11. A halftone plate according to claim 10, wherein said second highlight percentage is at most 48% and said second shadow percentage is at least 52%.

12. A halftone plate according to claim 10, wherein when the halftone dots are grown in the square or rhomboidal shape, they are successively grown along each of the sides thereof while minimizing any displacement of the center of gravity of the halftone dots.

13. A printed material expressing highlight and shadow areas of a subject with sizes of halftone dots, comprising:
- a first print section with the halftone dots formed in a circular or elliptical shape in a first transformation zone from a halftone percentage of 0% to a first highlight percentage;
- a second print section with the halftone dots grown while changing from the circular or elliptical shape to a square or rhomboidal shape in a second transformation zone from the first highlight percentage to a second highlight percentage greater than said first highlight percentage;
- a third print section with the halftone dots formed in a square or rhomboidal shape in a third transformation zone from the second highlight percentage to a second shadow percentage;
- a fourth print section with the halftone dots grown while changing from the square or rhomboidal shape to a circular or elliptical shape in a fourth transformation zone from the second shadow percentage to a first shadow percentage greater than said second shadow percentage; and
- a fifth print section with the halftone dots formed in a circular or elliptical shape in a fifth transformation zone from said first shadow percentage to a percentage of 100%.

14. A printed material according to claim 13, wherein said second highlight percentage is at most 48% and said second shadow percentage is at least 52%.

15. A printed material according to claim 13, wherein when the halftone dots are grown in the square or rhomboidal shape, they are successively grown along each of the sides thereof while minimizing any displacement of the center of gravity of the halftone dots.

\* \* \* \* \*